United States Patent [19]

Imada et al.

[11] Patent Number: 5,739,532
[45] Date of Patent: Apr. 14, 1998

[54] PYROELECTRIC IR SENSOR

[75] Inventors: Katsumi Imada, Katano; Takahiro Nishikura, Ikoma; Osamu Kawasaki, Tsuzuki-gun, all of Japan

[73] Assignee: Matsushita Electric Industrial Co., Ltd., Japan

[21] Appl. No.: 746,570

[22] Filed: Nov. 13, 1996

[30] Foreign Application Priority Data

Nov. 13, 1995 [JP] Japan ................. 7-293205
Jun. 12, 1996 [JP] Japan ................. 8-150778

[51] Int. Cl.⁶ ........................................... H01L 37/00
[52] U.S. Cl. ........................... 250/338.2; 250/338.3; 250/351
[58] Field of Search .................. 250/338.2, 338.3, 250/351

[56] References Cited

U.S. PATENT DOCUMENTS

| | | | |
|---|---|---|---|
| 4,485,305 | 11/1984 | Kuwano et al. | 250/338 |
| 4,631,406 | 12/1986 | Nakata | 250/338 |
| 5,058,250 | 10/1991 | Turnbull | 29/25.35 |
| 5,391,001 | 2/1995 | Rupert et al. | 250/338.1 |
| 5,659,416 | 8/1997 | Rupert et al. | 250/351 |

*Primary Examiner*—Don Wong
*Attorney, Agent, or Firm*—Parkhurst & Wendel

[57] ABSTRACT

A pyroelectric IR sensor equipped with a chopper for opening and closing a shielding plate so that infrared rays emitted from an object are allowed to be incident onto a pyroelectric sensor unit and intercepted therefrom, and having a structure capable of providing a large shielding width for the shielding plate without enlarging the chopper. Piezoelectric members are formed on a thin elastic sheet composed of a planar sheet having a tip to which a shielding plate is attached, except for a partial region which functions to magnify oscillations for enlarging displacement of the shielding plate.

10 Claims, 17 Drawing Sheets fr1: RESONANCE FREQUENCY OF ARM SECTION fr2: RESONANCE FREQUENCY OF DRIVING SECTION fr1: RESONANCE FREQUENCY OF ARM SECTION fr2: RESONANCE FREQUENCY OF DRIVING SECTION fr1: RESONANCE FREQUENCY OF ARM SECTION fr2: RESONANCE FREQUENCY OF DRIVING SECTION fr1: RESONANCE FREQUENCY OF ARM SECTION fr2: RESONANCE FREQUENCY OF DRIVING SECTION

PYROELECTRIC IR SENSOR

FIELD OF THE INVENTION

The present invention relates to a pyroelectric IR sensor which contactlessly detects infrared rays emitted from objects.

BACKGROUND OF THE INVENTION

In the recent years, pyroelectric IR sensors have been utilized in a broad range of fields for a variety of purposes such as measurements of temperatures of foodstuffs being cooked in electronic ovens, detection of locations of human bodies in areas cooled with air conditioners. The pyroelectric IR sensors utilize pyroelectric effects obtainable with pyroelectric materials such as $LiTaO_3$ single crystal.

Pyroelectric material have spontaneous polarization and always produce electric charges on surfaces thereof. However, the pyroelectric materials are kept electrically neutral in their steady states in atmosphere where the electric charges are coupled with those in the atmosphere. When infrared rays are incident on the pyroelectric materials, their temperatures are changed, thereby destroying or changing the neutral state of the electric charges on the surfaces. The pyroelectric IR sensors detect the electric charges produced on the surfaces, thereby measuring quantities of incident infrared rays.

Objects emit infrared rays in quantities which correspond to their temperatures. The pyroelectric effects which result from variations in quantities of incident infrared rays permit measuring temperatures and locations of the objects when infrared rays incident from the objects onto pyroelectric materials are periodically intermitted.

A chopper is used as means for periodically intermitting the infrared rays, and a pyroelectric IR sensor is composed of a pyroelectric member and a chopper. The pyroelectric IR sensor detects temperatures of objects while using the chopper for forcibly intermitting infrared rays incident on the pyroelectric member. An electromagnetic motor or a piezoelectric actuator is mainly used as the chopper.

For obtaining a piezoelectric actuator which is to be used as a chopper, a bonded element is composed by bonding a piezoelectric ceramic member to a thin elastic sheet made of a material such as a metal and one end of the bonded element is fixedly sustained so that it is warped by strain produced by applying a voltage to the piezoelectric ceramic member. A piezoelectric actuator which is composed of a thin elastic sheet having a piezoelectric ceramic members bonded to both surfaces thereof is generally referred to as a bimorph type, whereas a piezoelectric actuator composed of a thin elastic sheet having a piezoelectric ceramic member bonded only to one surface thereof is referred to as a unimorph type. The thin elastic sheet is referred to as an elastic shim member.

A conventional pyroelectric IR sensor which uses a bimorph type piezoelectric actuator as a chopper is configured as shown in FIG. 17.

A reference numeral 10 represents an elastic shim member, reference numerals 11a and 11b designate piezoelectric ceramic members, a reference numeral 12 denotes a shielding plate, a reference numeral 13 represents a stand, a reference numeral 14 designates a fixing member, a reference numeral 15 denotes a pyroelectric sensor unit comprising a pyroelectric member and a reference numeral 16 is infrared rays emitted from an object.

The piezoelectric ceramic members 11a and 11b are bonded to both surfaces of the elastic shim member 10 to compose a bimorph type element. Electrodes are formed on surfaces of the piezoelectric ceramic members 11a and 11b to polarize these members in directions along widths of the members.

The piezoelectric ceramic members 11a and 11b are polarized in directions which are variable dependently on directions of electric fields formed between the elastic shim member 10 and the piezoelectric ceramic sheets 11a and 11b respectively, and directions of polarization are determined so that the piezoelectric ceramic members 11a and 11b produce distortion in directions opposite to each other. Speaking concretely, a direction of an electric field and a direction of polarization are determined so that the piezoelectric ceramic member 11b is distorted to be contracted when the piezoelectric ceramic member 11a is distorted to be elongated.

The bimorph type element is sustained by sandwiching portions of the elastic shim member 10, piezoelectric ceramic members 11a and 11b between the stand 13 and the fixing member 14. The shielding plate 12 is attached to a tip of a free end of the bimorph type element. The pyroelectric sensor unit is disposed in the vicinity of the shielding plate 12 so that it cannot be brought into contact with the shielding plate which oscillates.

When electric fields are applied between the elastic shim member 10 and the piezoelectric ceramic members 11a and 11b respectively, the bimorph type element are warped with one end thereof kept fixed and the shielding plate 12 attached to the tip of the bimorph type element is reciprocally moved as directions of the applied electric fields are changed. The infrared rays 16 incident on the pyroelectric member 15 are intermittently intercepted by the reciprocal motions of the shielding plate 12.

DISCLOSURE OF THE INVENTION

The conventional chopper poses problems which are mentioned below:

The chopper must have a large size for obtaining a large shielding width with the shielding plate.

A higher voltage must be applied for obtaining a large shielding width with a smaller chopper.

A large displacement of bimorph type element causes stresses to be concentrated in the vicinity of the fixed end of the bimorph type element, thereby producing a risk of brittle fracture of the piezoelectric ceramic members.

Though it is necessary for effective shielding to minimize a distance between the pyroelectric sensor unit and the shielding plate, this distance cannot be extremely reduced since the shielding plate is moved also in the direction of the incident rays during its shielding motions.

Variations at assembly stages influence directly on characteristics of the pyroelectric IR sensor.

A primary object of the present invention is to provide a pyroelectric IR sensor which is configured to have a compactor size, higher reliability and higher versatility by reducing a size, enlarging displacement, enhancing reliability and reducing a manufacturing cost of a bimorph type piezoelectric chopper.

A pyroelectric IR sensor as claimed in claim 1 of the present invention is characterized in that the infrared IR sensor comprises a pyroelectric sensor unit for detecting infrared rays emitted from an object, a shielding plate for intercepting infrared rays from being incident onto the pyroelectric sensor unit, a thin elastic planar sheet having a fixed base end and a tip to which the shielding plate is attached to form a hook shape, and piezoelectric members or a piezoelectric member formed on both surface or one surface of the elastic thin sheet within a region from the base end to the tip of the thin elastic sheet except a partial region thereof and elongated and contracted by an applied voltage for warping the thin elastic sheet; and that the shielding plate is oscillated by the warping motions of the thin elastic sheet for intercepting the infrared rays from the pyroelectric sensor unit and releasing the interception.

Preferably, a driving frequency for the piece having the piezoelectric members is set in the vicinity of a resonance frequency of the piece having the piezoelectric members or member (when the piece has two resonance frequencies, and this piece is shaped so that the resonance frequencies are close to each other) so that large displacement is obtained at a low applied voltage. Further, a resonance frequency follower circuit which sets the driving frequency at the resonance frequency of the piece having the piezoelectric members or member is used so that the driving frequency is set nearly at the resonance frequency even when the resonance frequency is changed due to variations of ambient conditions such as temperature.

It is preferable to select a driving frequency between a resonance frequency of the portion having the piezoelectric members or member that of the other portion, thereby stabilizing displacement against variations of the driving frequency.

Still preferably, a resonance frequency of the portion having the piezoelectric members or member is set at a level higher than that of the other portion and a driving frequency is selected in the vicinity of the lower resonance frequency, thereby cancelling influences due to variations of piezoelectric element and enhancing temperature characteristic of displacement. It is further preferable to use a resonance frequency follower circuit which sets the driving frequency for the element at a resonance frequency of the element so that the driving frequency can be set nearly at the resonance frequency even when the resonance frequency is changed due to variations of ambient conditions such as temperature.

Further preferably, a resonance frequency of the portion having the piezoelectric members or member is set at a level lower than that of the other portion and a driving frequency is selected in the vicinity of the lower resonance frequency for cancelling influences due to variations of the elements. It is further preferable to use a resonance frequency follower circuit which sets the driving frequency for the element at a resonance frequency of the element so that the driving frequency is set nearly at the resonance frequency even when the resonance frequency is changed due to variations of ambient conditions such as temperature.

It is still further preferable to dispose two shielding plates for halving displacement required for allowing incidence of the infrared rays onto the pyroelectric sensor unit and shielding the sensor from the infrared rays, thereby nearly halving a voltage to be applied to each of the piezoelectric members or remarkably reducing a size of the shielding plates with the applied voltage kept unchanged from the level for a single shielding plate.

Still further preferably, the pyroelectric sensor unit is disposed so that the thin elastic sheet to which the shielding plate is attached is set perpendicularly to the direction of incidence of the infrared rays for efficient incidence of the infrared rays and shielding of the sensor unit. It is more preferable to continuously change the distance between the shielding plate and the pyroelectric sensor unit so that opening/closing speed and an aperture width of the shielding plate are constant as seen from the detector independently of positions of the shielding plate.

Still further preferably, a resonance frequency of torsional oscillations of the thin elastic sheet to which the shielding plate is attached is set at a level sufficiently higher than a driving frequency for suppressing the torsional oscillation during driving, thereby moving the shielding plate more efficiently and stably for allowing incidence of the infrared rays and shielding the sensor.

It is preferable to fix the thin elastic sheet to which the shielding plate is attached only at a portion not including the piezoelectric members or member (a portion composed only of the elastic shim member) for preventing brittle fracture of the piezoelectric members member and enhancing reliability.

A pyroelectric IR sensor as claimed in claim 2 of the present invention is characterized in that it comprises a pyroelectric sensor unit for detecting infrared rays emitted from an object, a shielding plate for shielding the pyroelectric sensor unit from the infrared rays, a thin elastic sheet which is formed by folding a planar sheet into a U shape from a base end toward a tip thereof, fixing the base end and attaching the shielding plate to a tip so as to form a hook-like shape, and a piezoelectric member or two piezoelectric members which are formed on one surface or both surfaces of the thin elastic sheet within a range from the base to the tip except a partial region so as to be elongated and contracted with an applied voltage for warping the thin elastic sheet; and that the shielding plate is oscillated for shielding the pyroelectric sensor unit from the infrared ray and allowing the infrared rays to be incident on the pyroelectric sensor unit.

It is preferable to set a driving frequency for the piezoelectric members or member in the vicinity of a resonance frequency of the piece having the piezoelectric members or member (when the bonded element has two resonance frequencies, this element is shaped so that the resonance frequencies are close to each other) so that large displacement is obtained at a low applied voltage. It is further preferable to use a resonance frequency follower circuit which sets the driving frequency at the resonance frequency of the element having the piezoelectric members or member so that the driving frequency is set nearly at the resonance frequency even when this frequency is changed dependently on ambient conditions such as temperature.

It is preferable to select a driving frequency between a resonance frequency of a portion having the piezoelectric members or member, thereby stabilizing displacement despite variations of the driving frequency.

Preferably, a resonance frequency of a surface of the thin U-shaped elastic sheet on which the piezoelectric member is disposed is set at a level higher than that of the other surface and a driving frequency is selected in the vicinity of the lower resonance frequency, thereby cancelling influences due to variations of the bonded element and enhancing temperature characteristic of displacement. It is further preferable to use a resonance frequency follower circuit which sets the driving frequency at a resonance frequency of the element having the piezoelectric members or member so that the driving frequency can be set nearly at the resonance frequency even when the resonance frequency is changed due to variations of ambient conditions such as temperature.

Still preferably, a resonance frequency of the surface of the thin U-shaped elastic sheet having the piezoelectric members or member is set at a level lower than that of the other surface and a driving frequency is selected in the vicinity of the lower resonance frequency for cancelling influences due to variations of the element. It is further preferable to use a resonance frequency follower circuit which sets the driving frequency at a resonance frequency of the piece having the piezoelectric members or member so that the driving frequency can be set nearly at the resonance frequency even when the resonance frequency is changed due to variations of ambient conditions such as temperature.

Further preferably, two shielding plates are used for approximately halving displacement required for allowing incidence of the infrared rays onto and shielding the pyroelectric sensor unit, thereby approximately halving a voltage to be applied to each piezoelectric member or remarkably reducing a size of the shielding plate with the applied voltage kept unchanged from the level in the case where a single shielding plate is used.

Furthermore preferably, the pyroelectric sensor unit is disposed so that the thin elastic sheet to which the shielding plate is attached is positioned perpendicularly to the direction of incidence of the infrared rays for efficient incidence and shielding of the infrared rays. It is further preferable to continuously change the distance between the shielding plate and the pyroelectric sensor unit so that opening/closing speed and an aperture width of the shielding plate are constant as seen from the detector independently of positions of the shielding plate.

Preferably, a resonance frequency of torsional vibrations of the thin elastic sheet to which the shielding plate is attached is set at a level sufficiently higher than the driving frequency for suppressing the torsional oscillations so that the shielding plate is moved more efficiently and stably for incidence of the infrared rays and shielding the pyroelctric sensor unit.

It is still preferable to fix the thin elastic sheet to which the shielding plate is attached only at a portion not including the piezoelectric member (a portion composed only of the elastic shim member) for preventing brittle fracture of the piezoelectric member and enhancing reliability.

A pyroelectric IR sensor as claimed in claim 3 of the present invention is characterized in that it comprises a pyroelectric sensor unit for detecting infrared rays emitted from an object, a thin elastic sheet which is composed by folding a planar sheet into an L shape, fixing one end thereof and attaching the shielding plate to the other end thereof so as to form a hook-like shape, and a thin elastic sheet or two thin elastic sheets formed on one or both surfaces within a range between the ends except a partial region, and elongated and contracted with an applied voltage for warping the thin elastic sheet; and that the shielding plate is oscillated for intercepting the infrared rays to be incident from the object onto the pyroelectric sensor unit and releasing the interception.

Preferably, a driving frequency for the piezoelectric members or member is set in the vicinity of a resonance frequency of the piece having the piezoelectric members or member (when the piece has two resonance frequencies, it is formed so as to have resonance frequencies close to each other) so that large displacement is obtained at a low applied voltage level and the shielding plate can have a small size. It is preferable to adopt a resonance frequency follower circuit which sets the driving frequency at the resonance frequency of the piece having the piezoelectric members or member so that the driving frequency can be set nearly at the resonance frequency even when the resonance frequency is changed due to variations of ambient conditions such as temperature.

Preferably, a driving frequency is selected between a resonance frequency of the portion having the piezoelectric members or member and a resonance frequency of the other portion for enhancing stability of the displacement despite variations of the driving frequency.

Still preferably, a resonance frequency of the surface of the thin L-shaped elastic sheet having piezoelectric members or member is set at a level higher than that of the other surface and a driving frequency is set in the vicinity of the lower resonance frequency for cancelling influences due to variations of the shielding plate and enhancing temperature characteristic of displacement. It is preferable to use a resonance frequency follower circuit which sets the driving frequency at a resonance frequency of the piece having the piezoelectric members or member so that the driving frequency can be set nearly at the resonance frequency even when the resonance frequency is changed due to variations of ambient conditions such as temperature.

Further preferably, a resonance frequency of the surface of the thin L-shaped elastic sheet having the piezoelectric members or member is set at a level lower than that of the other surface and a driving frequency is set in the vicinity of the lower resonance frequency for cancelling influences due to variations of the shielding plate. It is preferable to use a resonance frequency follower circuit which sets the driving frequency at the resonance frequency of the piece having the piezoelectric members or member so that the driving frequency can be set nearly at the resonance frequency even when the resonance frequency is changed due to variations of ambient conditions such as temperature.

Further preferably, two shielding plates are disposed for approximately halving displacement required for allowing incidence of the infrared rays onto the pyroelectric sensor unit and shielding the pyroelectric sensor unit from the infrared rays, thereby approximately halving a voltage to be applied to each piezoelectric member. Further, a size of the shielding plates may be remarkably reduced with a voltage to be applied kept unchanged from a level adopted in a case where a single shielding plate is used.

Still further preferably, the pyroelectric sensor unit is disposed to position the thin elastic sheet to which the shielding plate is attached perpendicularly to the direction of incidence of the infrared rays for efficient incidence of the infrared rays and shielding the pyroelectric sensor unit. It is preferable to continuously change a distance between the shielding plate and the pyroelectric sensor unit so that an opening/closing speed and aperture width of the shielding plate as seen from the detector are constant despite positions of the shielding plate.

Still further preferably, a resonance frequency of torsional vibrations of the thin elastic sheet to which the shielding plate is attached is set at a level sufficiently higher than a driving frequency for suppressing the torsional vibrations at the driving time, thereby enhancing efficiency and stability of incidence of the infrared rays and shielding of the pyroelectric sensor unit.

It is still further preferable to fix the thin elastic sheet to which the shielding plate is attached only at a portion not including the piezoelectric member (portion composed only of the elastic shim member) for preventing brittle fracture of the piezoelectric member and enhancing reliability.

A pyroelectric IR sensor as claimed in claim 4 of the present invention is characterized in that it comprises a pyroelectric sensor unit for detecting infrared rays emitted from an object, shielding plates for intercepting the infrared rays from being incident onto the pyroelectric sensor unit, a thin elastic sheet composed by folding a planar sheet into a U shape turned sideways to form three surfaces; that a surface connecting the other two surfaces is fixed in a middle or a vicinity thereof with a fixing member and the shielding plates are attached to ends of the other two surfaces so as to form hook-like shapes; that a piezoelectric member or two piezoelectric members are formed one side or both sides of the connecting surface except partial regions, and elongated and contracted with an applied voltage for warping the thin elastic sheet; and that the shielding plates are oscillated by warping motions of the thin elastic sheet for intercepting the infrared rays from being incident from the object onto the pyroelectric sensor unit and releasing the interception.

Preferably, a driving frequency for the piece having the piezoelectric member is set in the vicinity of a resonance frequency of the piece having the piezoelectric member (when the piece has two resonance frequencies, it is shaped so as to bring the resonance frequencies close to each other) so that a large displacement is obtained at a low applied voltage level and the shielding plates may be small. It is preferable to use a resonance frequency follower circuit which set the driving frequency at a resonance frequency of the piece having the piezoelectric member so that the driving frequency can be set nearly at the resonance frequency even when the resonance frequency is changed due to variations of ambient conditions such as temperature.

It is also preferable to drive the piezoelectric member at a frequency between a resonance frequency of the other two surfaces of the thin elastic sheet and a resonance frequency of the middle connecting surface for enhancing stability of displacement despite variations of the driving frequency. It is preferable to adopt a resonance frequency follower circuit which sets the driving frequency at the resonance frequency of the piece having the piezoelectric member so that the driving frequency can be set nearly at the resonance frequency even when the resonance frequency is changed due to variations of ambient conditions such as temperature.

Still preferably, a resonance frequency of the middle surface of the thin elastic sheet is set at a level lower than a resonance frequency of the other two surfaces and a driving frequency is set in the vicinity of the lower resonance frequency for cancelling influences due to variations of the shielding plates and enhancing temperature dependency of displacement.

It is preferable to use a resonance frequency follower circuit which sets the driving frequency at the resonance frequency of the piece having the piezoelectric member so that the driving frequency can be set nearly at the resonance frequency even when the resonance frequency is changed due to variations of ambient conditions such as temperature.

Further preferably, the pyroelectric sensor unit is disposed so as to position the thin elastic sheet to which the shielding plates are attached perpendicularly to the direction of incidence of the infrared rays for efficient incidence of the infrared rays and shielding of the pyroelectric sensor unit. It is preferable to continuously change a distance between the shielding plates and the pyroelectric sensor unit so that an opening/closing speed and an aperture width as seen from the detector are constant despite positions of the shielding plates.

Still further preferably, a resonance frequency of torsional oscillation of the thin elastic sheet to which the shielding plates are attached is set at a level sufficiently higher than the driving frequency for suppressing the torsional oscillation during driving, thereby enhancing efficiency and stability of the motions of the shielding plates for incidence and interception of the infrared rays. Still further preferably, the shielding plate is fixed to the thin elastic sheet only on a portion not including the piezoelectric member (a portion composed only of the elastic shim member) for preventing brittle fracture of the piezoelectric member and enhancing reliability.

Each of the configurations described above permits reducing a size, increasing displacement, enhancing reliability and lowering a manufacturing cost of a piezoelectric bimorph type chopper, thereby making it possible to provide to markets compact pyroelectric IR sensors which have high reliably and high versatility.

EMBODIMENTS

Now, description will be made of embodiments of the pyroelectric IR sensor according to the present invention which are illustrated in FIGS. 1 through 16.
(First embodiment)

Figure 1:
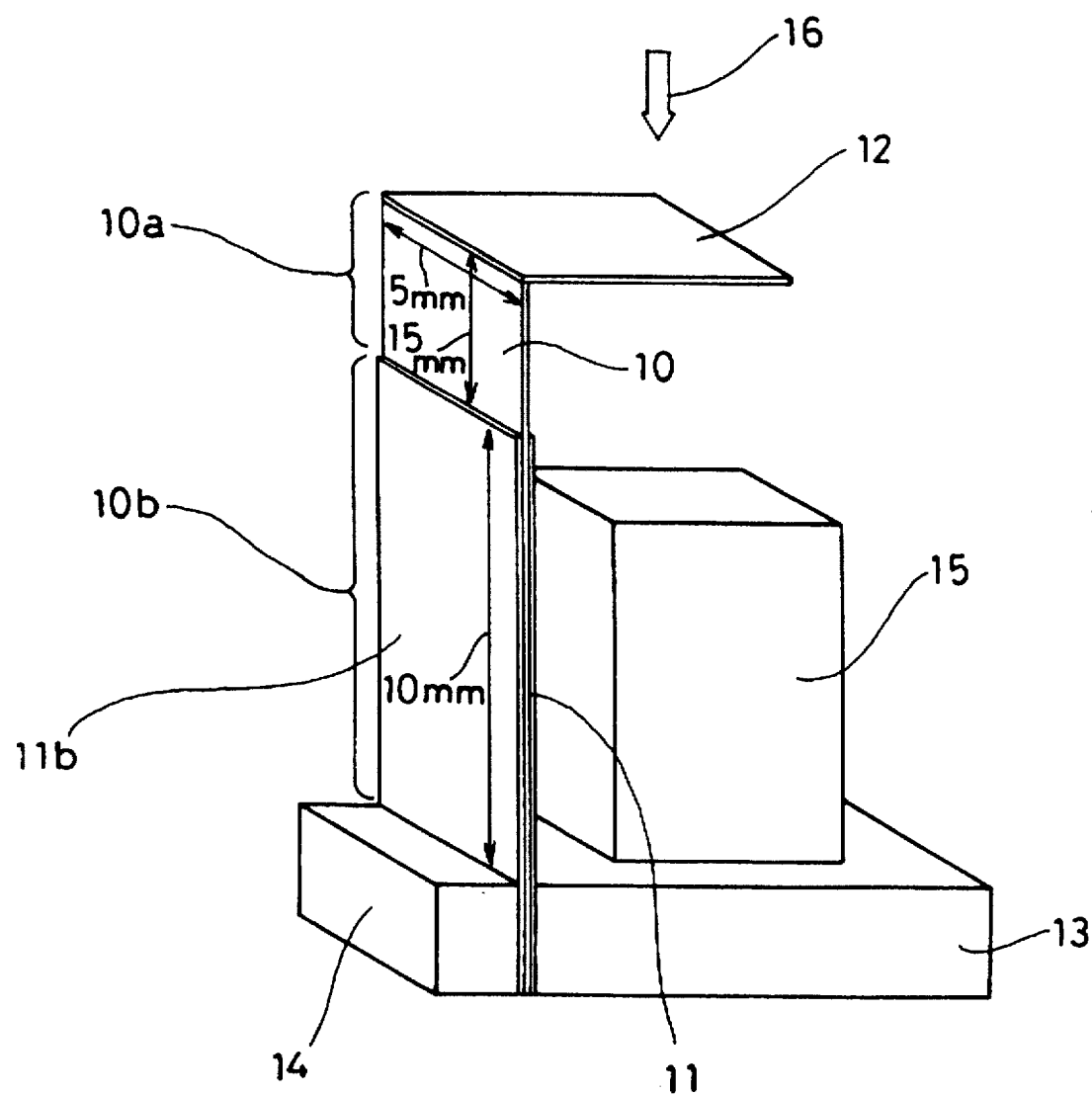
FIG. 1 is a perspective view illustrating a configuration of a first example of a first embodiment of the pyroelectric IR sensor using a bimorph type piezoelectric actuator according to the present invention.

FIG. 1 shows a first example of the pyroelectric IR sensor according to the present invention.

A reference numeral 10a represents an arm section, of an elastic shim member 10 and a reference numeral 10b designates a driving section for the shim member 10.

Figure 17:
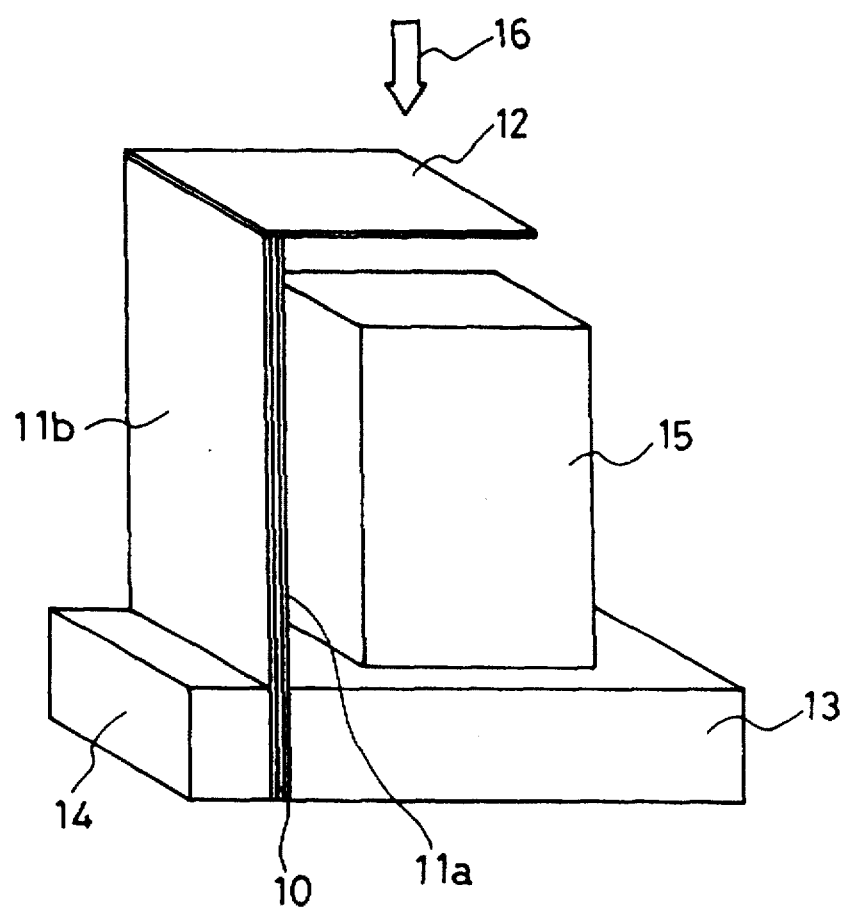
FIG. 17 is a perspective view illustrating the conventional pyroelectric IR sensor.

Other members which have functions similar to those of the members of the conventional IR sensor in FIG. 17 will be described using the same reference numerals.

The pyroelectric IR sensor preferred as the first example utilizes a bimorph type piezoelectric actuator as a chopper, and comprises a pyroelectric sensor unit 15 which detects an infrared ray 16 emitted from an object, a shielding plate 12 for shielding the infrared ray 16 to be incident onto the pyroelectric sensor unit 15, the elastic shim member 10 configured as a thin planar elastic sheet which has a fixed end and the other end to which the shielding plate 12 is attached, and piezoelectric ceramic members 11a and 11b which are piezoelectric elements on both surfaces of the elastic shim member 10 except a partial region.

A piezoelectric chopper for controlling incidence and interception of the infrared ray onto and from the pyroelectric sensor unit 15 is composed of the elastic shim member 10, piezoelectric ceramic members 11a, 11b and the shielding plate 12.

In the first embodiment, a thin metal sheet is used as the elastic shim member 10, the arm section 10a is composed only of the metal sheet, and the piezoelectric ceramic members 11a and 11b are bonded to a front and rear surfaces of the elastic shim member 10 to compose a bimorph type element which functions as a driving section 10b.

The elastic shim member 10 is disposed so that the longitudinal direction of the planar sheet is in parallel with the direction of incidence of the infrared ray 16 and has a base end which is attached together with the piezoelectric ceramic members 11a and 11b to a stand 13 with a fixing member 14. The shielding plate is attached to the arm section 10a of the elastic shim member 10 at a right angle so that it shields the pyroelectric sensor unit 15 from the infrared ray 16.

The elastic shim member 10 which is composed of the thin metal sheet functions as an electrode for one of the piezoelectric ceramic members 11a and 11b, and electrodes (not shown) for the piezoelectric ceramic members 11a and 11b are formed on surfaces of the electrodes 11b and 11a respectively. The piezoelectric ceramic members 11a and 11b are treated so that they are polarized in a direction of their width and bonded to the elastic shim member 10 so that they are warped in directions opposite to each other taking into consideration the directions of polarization and electric fields to be applied.

When an electric field is formed between the elastic shim member 10 and the piezoelectric ceramic member 11a by applying a voltage between the elastic shim member 10 and the piezoelectric ceramic member 11a in the configuration described above, the driving section 10b is excited and defectively oscillated, and the oscillation is propagated to the arm section 10a, thereby oscillating the shielding plate 12 attached to the tip. The driven shielding plate 12 allows the infrared ray 16 to be incident intermittently onto the pyroelectric sensor unit 15.

The first embodiment makes it possible to largely displace the shielding plate 12 or obtain large displacement at a low applied voltage level, thereby obtaining a highly reliable pyroelectric IR sensor owing to the fact that the elastic shim member 10 into two regions: the arm section 10a where the piezoelectric ceramic members 11a and 11b are not formed, and the driving section 10b where the piezoelectric ceramic members 11a and 11b are formed.

Figure 15:
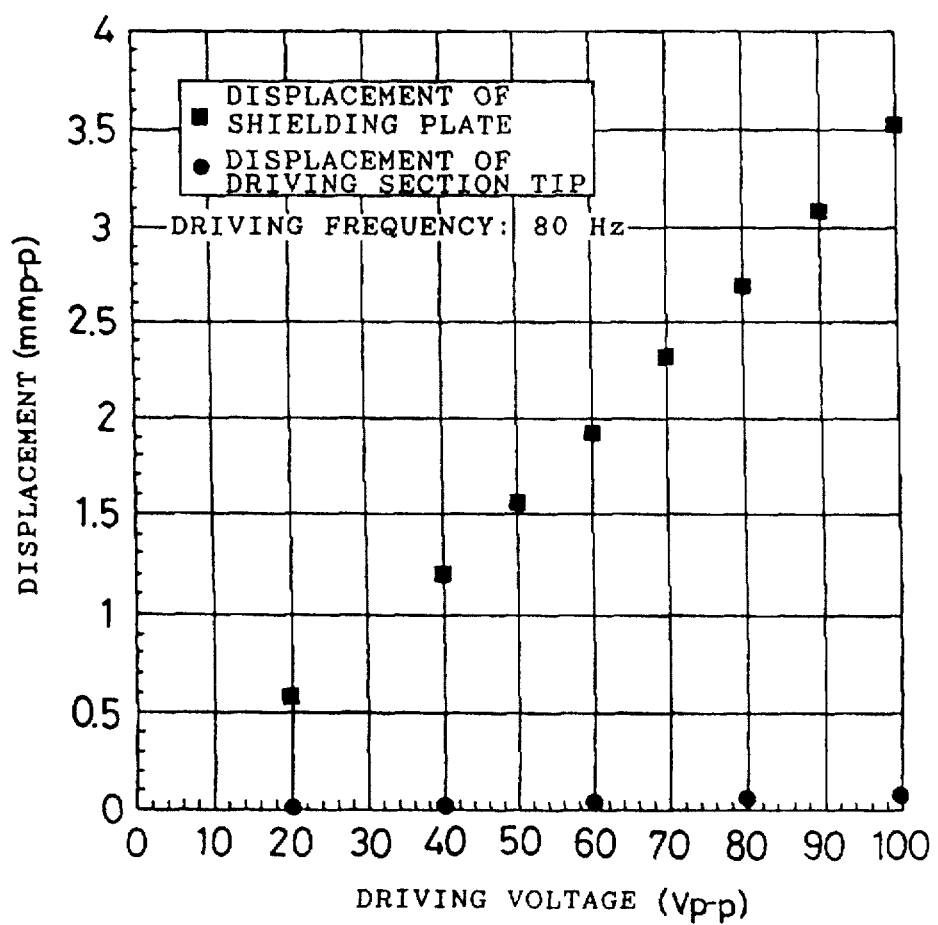
FIG. 15 is a graph illustrating measured results of displacements of a tip of a driving section and the shielding plate when the chopper of the first embodiment of the pyroelectric IR sensor is driven at 80 Hz.
Figure 16:
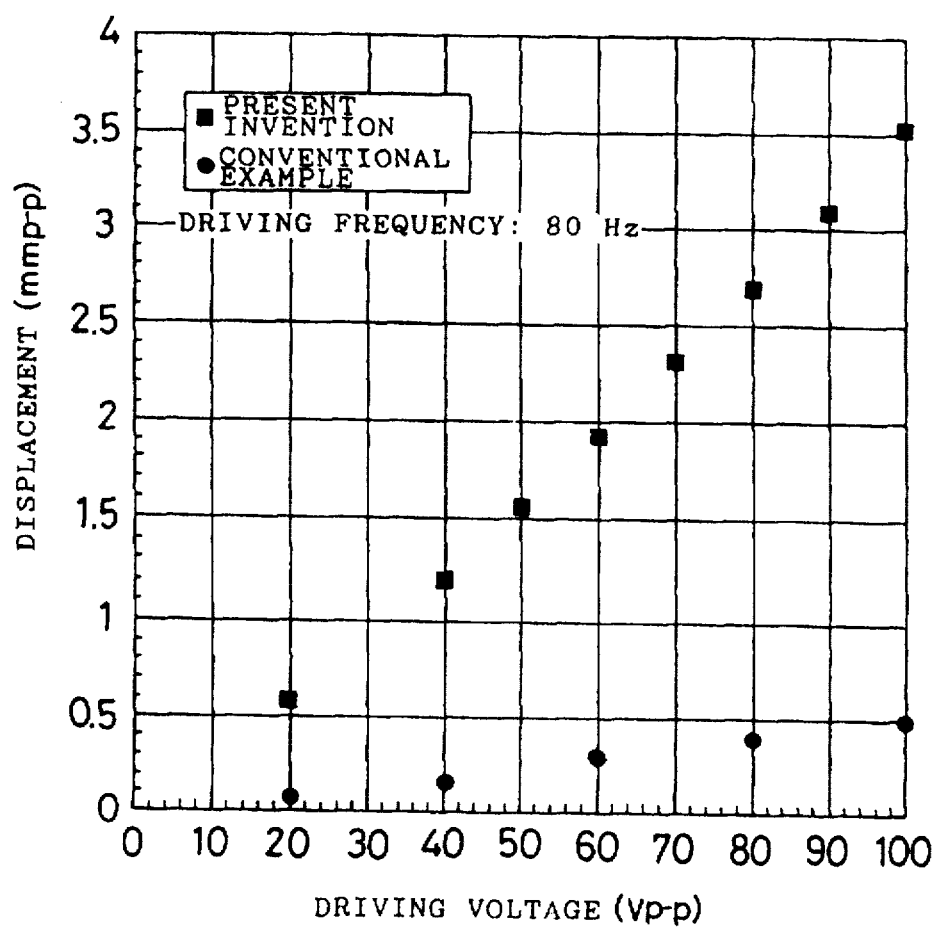
FIG. 16 is a graph illustrating measured results of displacements of the shielding plate when the chopper of the first embodiment of the pyroelectric IR sensor is driven at 80 Hz and displacements of a shielding plate of a conventional IR sensor which has no arm.

FIG. 15 summarizes measured results of displacement of a tip of the driving section 10b and displacement of the shielding plate 12 at a driving frequency of 80 Hz. From FIG. 15, it will be understood that displacement is magnified approximately 35 times as large by providing the arm section 10a which is 15 mm long.

The first embodiment of the present invention provides displacement approximately seven times as large as that in the conventional example (shown in FIG. 17) which has the same length as that of the embodiment. Speaking concretely, it has been confirmed that the first embodiment of the present invention provides, at a driving frequency of 80 Hz, displacement of the shielding plate 12 which is approximately seven times as large by comparing the embodiment which used the elastic shim member 5 mm wide, the driving section 10b 10 mm long and the arm 10a 15 mm long as shown in FIG. 1 with the conventional example which used a driving section having no arm 10a shown in FIG. 1 and 25 mm long.

Figure 2:
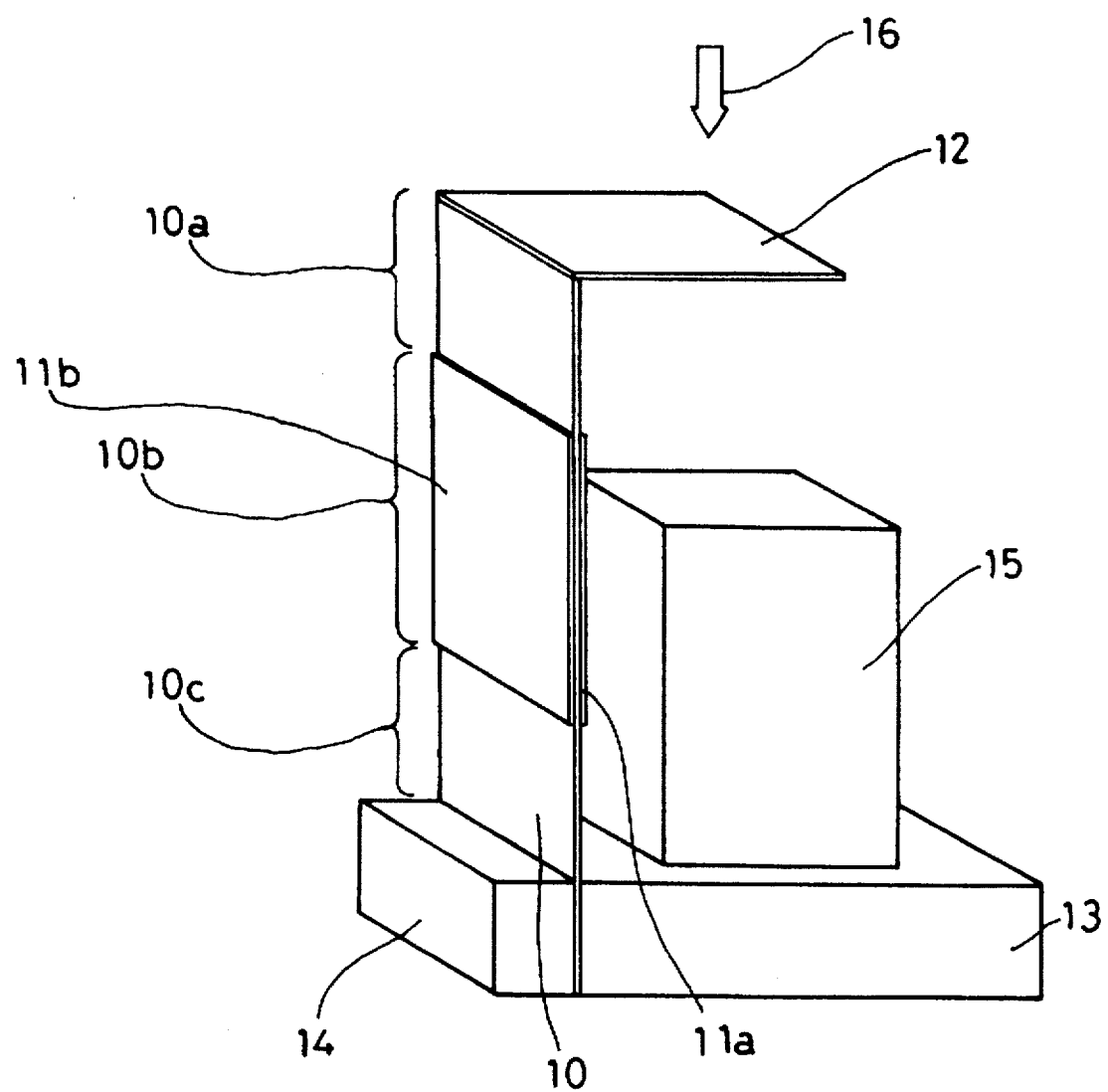
FIG. 2 is a perspective view illustrating a configuration of a second example of the first embodiment of the pyroelectric IR sensor using the bimorph type piezoelectric actuator according to the present invention.

FIG. 2 shows a second example of the first embodiment of the pyroelectric IR sensor according to the present invention.

In FIG. 2, a reference numeral 10c represents a leg section which is composed only of an elastic shim member 10 and other members which have functions similar to those of the members used in the first example shown in FIG. 1 are designated by the same reference numerals.

In a pyroelectric IR sensor preferred as the second example, piezoelectric ceramic members 11a and 11b are bonded at locations different from those shown in FIG. 1. Speaking concretely, the elastic shim member 10 is composed of three sections: an arm section 10a, a driving section 10b and the leg section 10c. A shielding plate 12 is attached and fixed to a tip of the arm section 10a, whereas the piezoelectric ceramic members 11a and 11b are bonded to a front and rear surfaces of the elastic shim member 10. The leg section 10c is attached to a stand 13 with a fixing member 14.

The configuration described above provides effects similar to those obtained with the configuration shown in FIG. 1 and is capable of preventing brittle fracture of the piezoelectric ceramic members 11a and 11b due to stresses concentrated in the vicinity of the fixed portion since the piezoelectric ceramic members 11a and 11b are not fixed directly to the stand 13 and the fixing member 14.

Though the driving section 10b is the bimorph type in each of the first and second examples described above, similar effects can be obtained by using a unimorph type driving section.

Though a single piezoelectric chopper and a single pyroelectric sensor unit are used in each of the first and second examples described above, it is possible to dispose two piezoelectric choppers on both sides of the pyroelectric sensor unit 15 or configure the pyroelectric IR sensor to comprise two piezoelectric choppers and two pyroelectric sensor units 15 and shield the pyroelectric sensor unit 15 with two shielding plates 12 of the two piezoelectric choppers. In this case, an aperture diameter of the two shielding plates over the pyroelectric sensor unit 15 can be twice as large by supplying each of the driving sections 10b for the two piezoelectric choppers with a voltage kept unchanged from the voltage level applied to the single piezoelectric chopper or halve the voltage to be supplied to each of the two driving sections 10b with the aperture diameter kept unchanged from that formed with the single piezoelectric chopper. This merit is obtainable also with embodiments which are described below.

Needless to say, the similar effects can be obtained by using a high polymer material having a piezoelectric effect or a single crystal having a piezoelectric effect such as LiNbO3 or LiTaO3 in place of the piezoelectric ceramic members 11a and 11b, by adopting an elastic shim plate 10 made of an electrically conductive resin sheet in place of the elastic shim member 10 made of the thin metal sheet and by configuring the piezoelectric ceramic members 11a and 11b so as to have a disk-like or ring-like shape which rather lowers a driving efficiency. This fact is applicable also to the embodiments which are described below.

Figure 3:
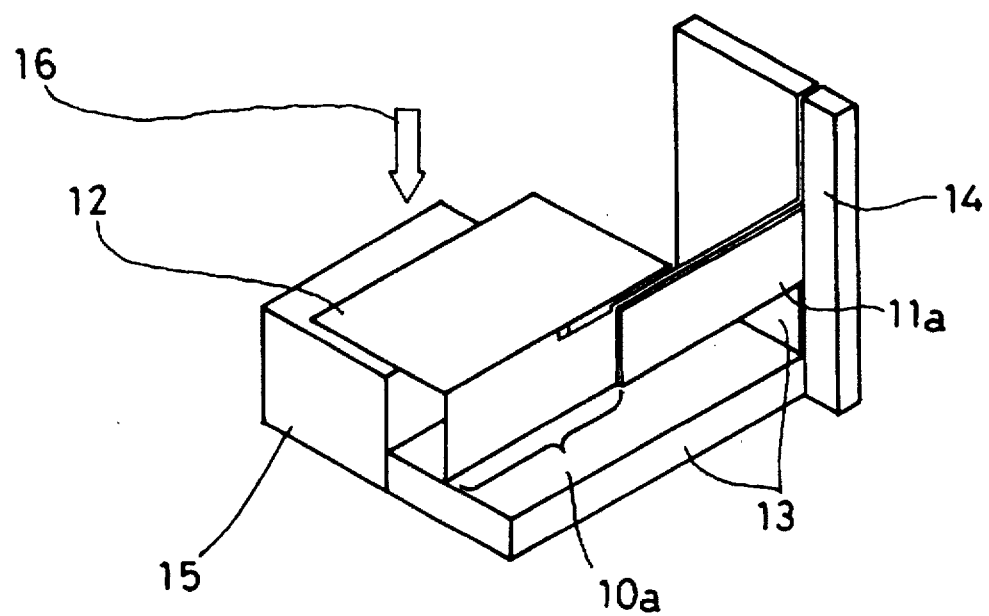
FIG. 3 is a perspective view illustrating a third example of the first embodiment of the pyroelectric IR sensor using the bimorph type piezoelectric actuator according to the present invention.

FIG. 3 shows a third example of the first embodiment of the pyroelectric IR sensor according to the present invention.

For description of the third example, members thereof which have functions similar to those of the members of the first example shown in FIG. 1 will be represented by the same reference numerals. A pyroelectric IR sensor preferred as the third example is different from the first example shown in FIG. 1 in positional relationship between a piezoelectric chopper and a pyroelectric sensor unit 15, and attachment of shielding plate 12.

Speaking concretely of the third example, an elastic shim member 10 is composed of two sections: an arm section 10a and a driving section 10b. A shielding plate 12 is attached to a tip of the arm section 10a. Piezoelectric ceramic members 11a and 11b are bonded to front and rear surfaces of the elastic shim member 10 in the driving section 10b, and attached to a stand 13 with a fixing member 14.

The pyroelectric sensor unit 15 is disposed so that a longitudinal direction of the arm section 10a is perpendicular to the direction of incidence onto the pyroelectric sensor unit 15. Accordingly, the shielding plate 12 is attached at a right angle to the arm section 10a of the elastic shim member 10 so that the shielding plate shields the pyroelectric sensor unit 15 from an infrared ray 16.

The configuration described above provides the same effect as those obtained with the configuration shown in FIG. 1.

Two piezoelectric choppers may be disposed on both sides of the pyroelectric sensor unit 15 so that the pyroelectric sensor unit 15 is shielded over with two shielding plates 12 of the two piezoelectric choppers. In this case, an aperture diameter can be twice as large by supplying each of driving sections 10b for the two piezoelectric choppers with a voltage selected for the single piezoelectric chopper or the voltage can be halved for each of the two driving sections with an aperture diameter kept unchanged from that obtained with the single piezoelectric chopper.

Further, the third example is capable of reducing displacement of the shielding plate 12 in the direction of incidence of the infrared ray 16.

Accordingly, the third example permits disposing the shielding plate 12 closer to the pyroelectric sensor unit 15, thereby reducing displacement required for the chopper and allowing the driving section to be operated with a lower voltage.

For the chopper used in the third example, resonance frequency of torsional oscillation of the arm section 10a including the shielding plate 12 is designed at a level two or more times as high as a resonance frequency of deflective oscillation thereof. A resonance frequency of deflective oscillation frb and a resonance frequency of torsional oscillation frr are approximatively expressed as follows:

$$f_{rb} = \frac{1}{2\pi} \cdot \sqrt{\{E \cdot Ip/(\rho \cdot A)\}} \cdot n^2$$

wherein the reference symbols are:

L . . . a total length of the arm section
E . . . a modulus of longitudinal elasticity
Ip . . . a secondary moment of section of arm
$\rho$ . . . a density of arm
A . . . a sectional area of arm
G . . . a modulus of lateral elasticity of arm
m . . . a mass added to tip
J . . . a rotation moment of the mass added to the tip
n . . . a solution of the following equation $m \cdot n$ {sin $(nL)$ cos $(nL)$–cos $(nL)$–cos$(nL)$sinh $(nL)$}=$\rho \cdot A$ {1+cos $(nL)$ cos $(nL)$}

$$f_{rr} = \frac{1}{2\pi} \cdot \sqrt{\left[ G \cdot Ip/ \left\{ L \cdot \left( \frac{J + Ip \cdot \rho \cdot L}{3} \right) \right\} \right]}$$

Accordingly, the present invention makes it possible to obtain a bonded element having an optional shape by using the two formulae shown above in a condition of $f_{rb} < (½) f_{rr}$.

Further, the third example provides effects similar to those obtained with the configuration shown in FIG. 2 when the elastic shim member 10 is composed of an arm section 10a, a driving section 10b and a leg section 10c.

Figure 4:
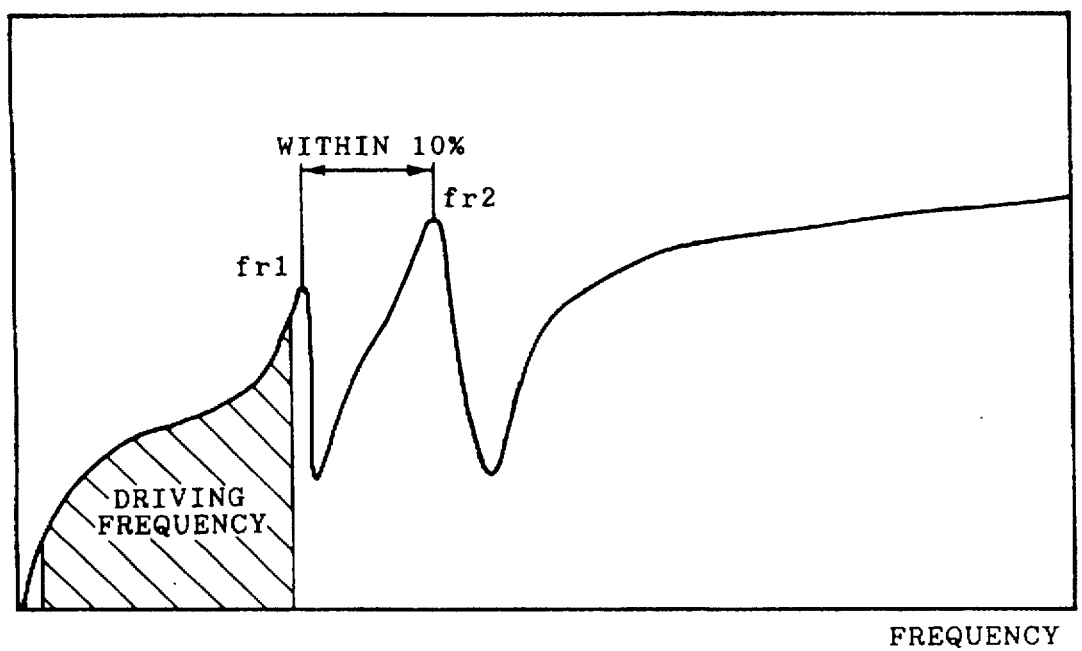
FIG. 4 is a graph illustrating a first admittance-frequency characteristic of a chopper for the first embodiment of the pyroelectric IR sensor.

FIG. 4 is a graph illustrating a first admittance characteristic of the chopper used in the pyroelectric IR sensor preferred as the first embodiment which is traced on a coordinates system wherein the ordinate represents admittance and the abscissa designates frequency. The reference symbol $f_{r1}$ represents a resonance frequency of the arm section 10a which is set within a range from 5 to 150 Hz. The reference symbol $f_{r2}$ designates a resonance frequency of the driving section and a frequency deviation is suppressed below 10% of the resonance frequency of the arm section or a resonance frequency of a connecting surface whichever is higher. The hatched area represents a driving region of the piezoelectric chopper. Since the frequency deviation is suppressed within 10%, the chopper can be driven even at frequencies in the vicinities of the resonance frequency and a magnification of the driving section by the arm section can be set at a remarkably high level.

Accordingly, the first embodiment is capable of driving the chopper for the pyroelectric IR sensor at an extremely low applied voltage level and effectively usable with a sensor which is easily influenced by voltage in particular.

Figure 5:
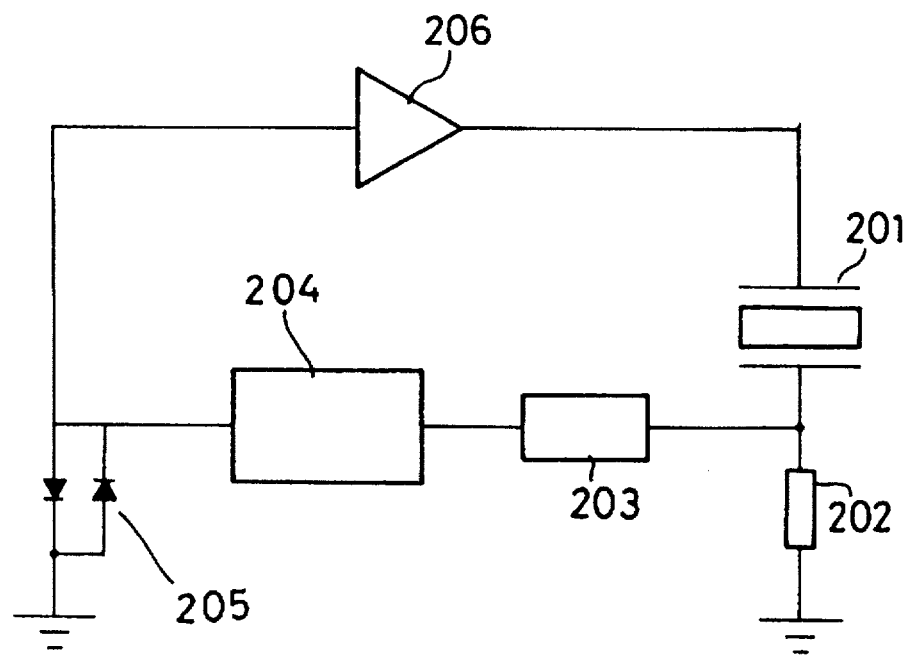
FIG. 5 is a circuit diagram illustrating a driving circuit for following a resonance frequency of the chopper for the first embodiment of the pyroelectric IR sensor.

Since a resonance frequency of the same bimorph type element is changed dependently on ambient conditions such as temperature, a resonance frequency follower circuit is frequently adopted. FIG. 5 exemplifies a circuit for following a resonance frequency of a bimorph type element. A reference numeral 201 represents a bimorph type element, a reference numeral 202 designates a resistor, a reference numeral 203 denotes a band pass filter, a reference numeral 204 represents a phase shifter circuit, a reference numeral 205 designates a limiter and a reference numeral 206 denotes an amplifier.

A current supplied to the bimorph type element 201 is converted into a voltage by the resistor 202, waveform shaping with the band pass filter 203, a resonance point is discriminated by the phase shifter circuit 204, and signals are amplified with the amplifier 206 and fed back to the bimorph type element 201.

Since the resonance point is always followed, the driving section can be driven always at its resonance frequency, thereby making it unnecessary to adjust the resonance frequency against machining variations of the bimorph type element and variations of fixed positions thereof.

Merits similar to those of the first embodiment described above will be obtained also with embodiments which are explained below.

Figure 6:
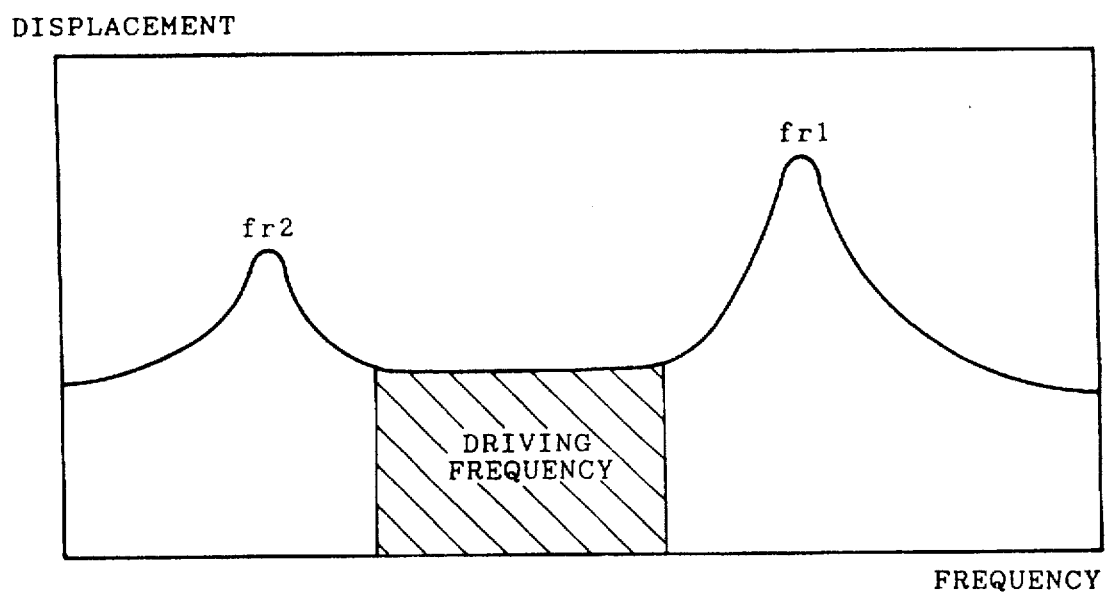
FIG. 6 is graph illustrating a second admittance-frequency characteristic of the chopper for the first embodiment of the pyroelectric IR sensor.

FIG. 6 shows a second admittance characteristic (sensitivity characteristic) of the chopper used in the first embodiment of the pyroelectric IR sensor according to the present invention which is traced a coordinates system on which the ordinates represents displacement of the bimorph element and the abscissa designates frequency. The reference symbol $f_{r2}$ represents resonance frequency of the arm section 10a which is selected within a range from 20 to 200 Hz. The reference symbol $f_{r2}$ designates a resonance frequency of the driving section 10b which is set at 5 to 150 Hz. When a difference between $f_{r1}$ and $f_{r2}$ is set within a range of approximately 30% of $f_{r1}$, two resonances influence on each other within a hatched range of driving frequencies, thereby capable of maintaining an operating condition in which displacement is almost constant even with the change of the driving frequency. In other words, it is possible, by setting a driving frequency within this region to obtain a chopper whose displacement is not influenced due to variations of the driving frequency. Further, it is possible by adopting this driving method to absorb variations of a resonance frequency or improve a temperature characteristic of variations of displacement since a temperature characteristic of an ordinary bimorph element is traced to cause of variations in positional relationship between a resonance frequency and a driving frequency.

Though $F_{r1}$ is higher than $F_{r2}$ in the foregoing description, the similar effect can be obtained even when $f_{r1}$ is lower than $f_{r2}$ except for phases of the motions of the shielding plate, or the outputs corresponding to the input signals, are inverted dependently on driving conditions. This fact described with reference to the first embodiment is applicable to embodiments which are described below.

Figure 7:
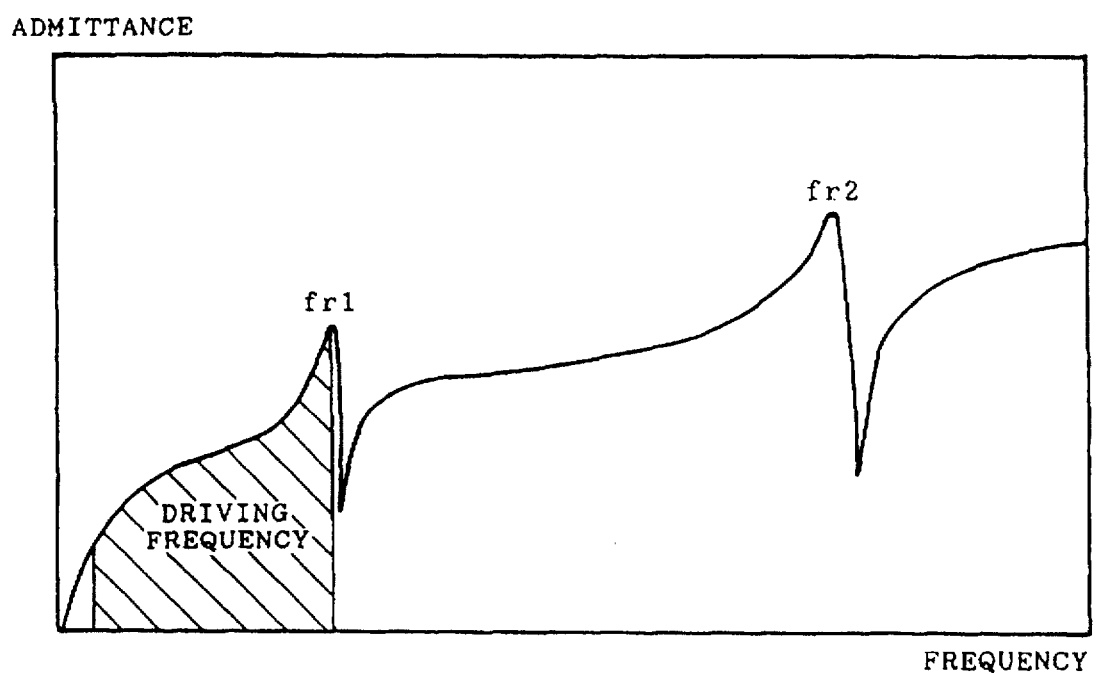
FIG. 7 is a graph visualizing a third admittance-frequency characteristic of the chopper for the first embodiment of the pyroelectric IR sensor.

FIG. 7 shows a graph illustrating a third admittance characteristic of the chopper for the pyroelectric IR sensor preferred as the first embodiment which is traced on a coordinates system wherein admittance is taken as the ordinate and frequency is taken as the abscissa. The reference symbol $f_{r1}$ represents a resonance frequency of the arm section 10a which is concretely set at 5 to 150 Hz. The reference symbol $f_{r2}$ designates a resonance frequency of the driving section 10b which is concretely set at 10 to 300 Hz so that $f_{r1}$ is set at ½ of $f_{r2}$ or sufficiently lower than $f_{r2}$. The hatched region represents a range within which the piezoelectric chopper is driven and the driving frequency is selected in the vicinity of $f_{r1}$ for magnifying oscillations of the connecting surface at a high ratio. Further, since the driving frequency is selected at a level far lower than the resonance frequency $f_{r2}$ the temperature characteristic of oscillations of the driving section which is an oscillation source and influences to variations or dimensional errors of individual elements are ignorable.

Further, the similar effect can be obtained by using a resonance frequency follower circuit for a bimorph type element which has a characteristic similar to the first admittance characteristic of first embodiment of the chopper for the pyroelectric IR sensor shown in FIG. 4. This fact described with reference to the first embodiment is applicable also to embodiments which are explained below.

Figure 8:
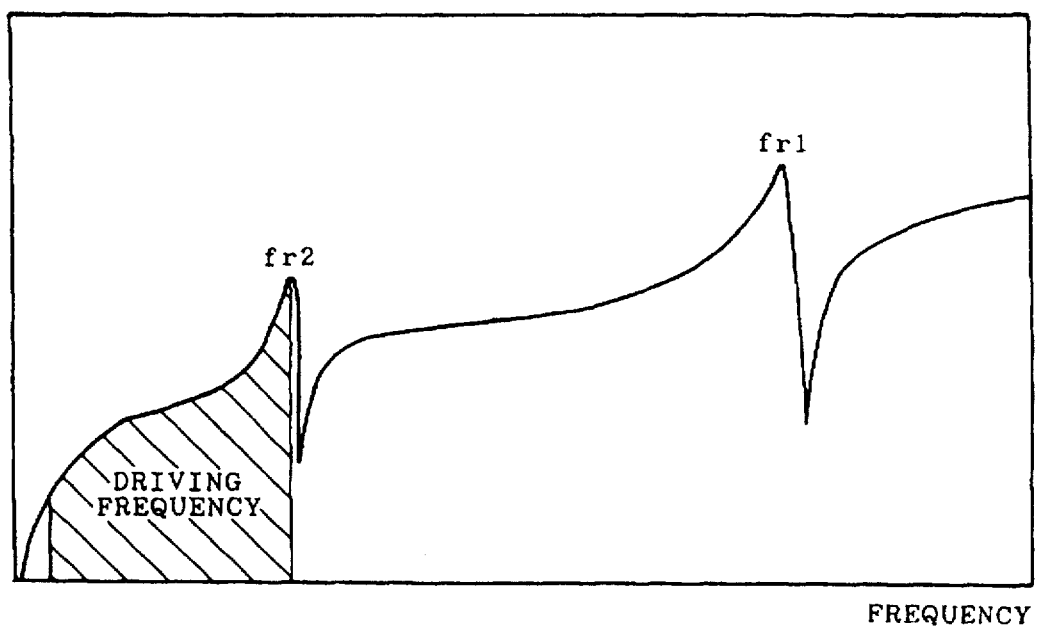
FIG. 8 is a graph visualizing a fourth admittance-frequency characteristic of the chopper for the first embodiment of the pyroelectric IR sensor.

FIG. 8 illustrates a fourth admittance characteristic of the chopper for the first embodiment of the pyroelectric IR sensor which is traced in a coordinates system wherein admittance is taken as the ordinate and frequency is taken as the abscissa. The reference symbol $f_{r1}$ represents a resonance frequency of the arm section 10a which is concretely set at 10 to 300 Hz. The reference symbol $f_{r2}$ designates a resonance frequency of the driving section 10b which is concretely set at 5 to 150 Hz. $f_{r2}$ is set at ½ of $f_{r1}$ or sufficiently lower than $f_{r1}$.

A slashed area indicates a frequency range within which the piezoelectric chopper is driven and a driving frequency is selected in the vicinity of $f_{r2}$ for oscillating the driving section sufficiently largely. Accordingly, the first embodiment can reduce variations of the characteristic to be caused dependently on dimensional errors of the arm section which is used for magnifying displacement. A similar effect can be obtained by using a resonance follower circuit for bimorph type element which has a characteristic similar to the first admittance characteristic of the chopper for the first embodiment of the pyroelectric IR sensor shown in FIG. 4. This is also applicable to embodiments which are described below.

(Second Embodiment)

Figure 9:
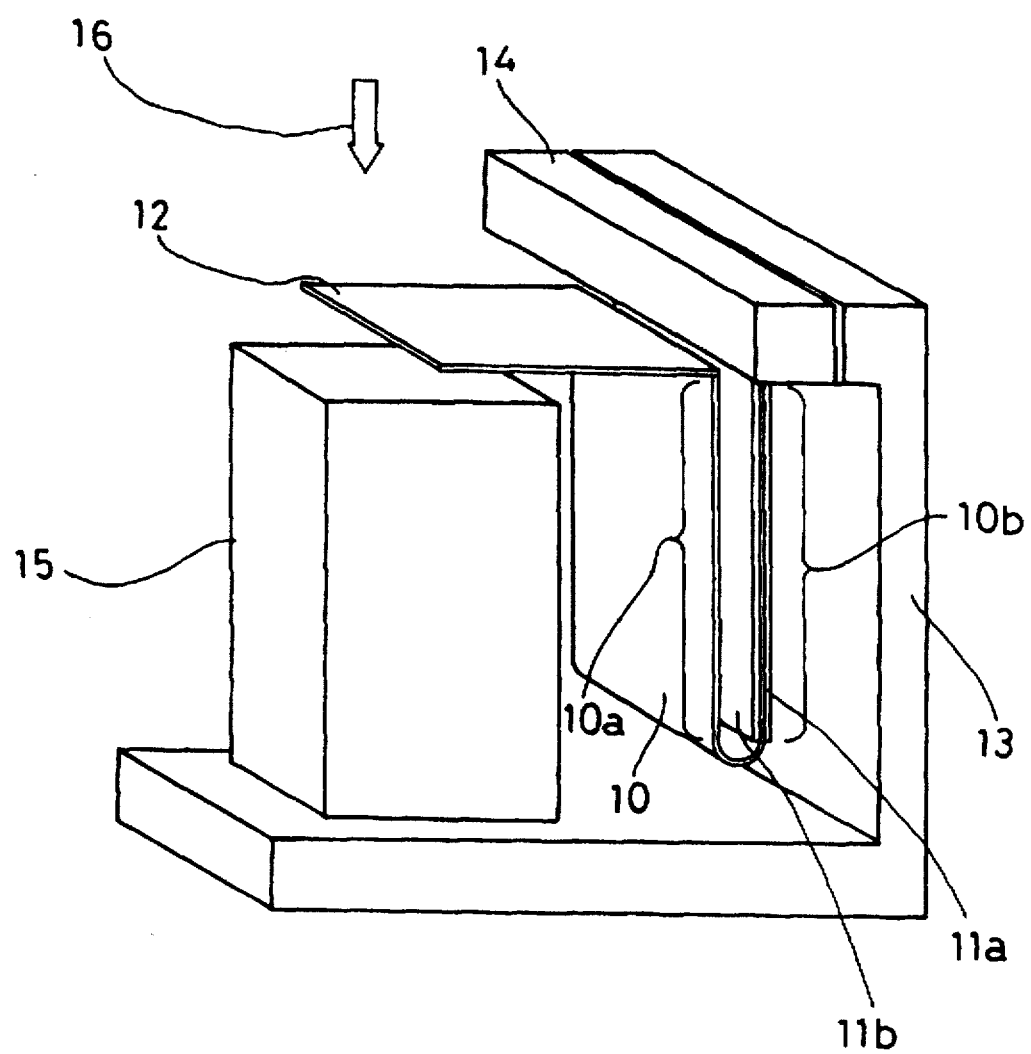
FIG. 9 is a perspective view illustrating a configuration of a second embodiment of the pyroelectric IR sensor using the bimorph type piezoelectric actuator according to the present invention.

FIG. 9 shows the second embodiment of the pyroelectric IR sensor according to the present invention.

Members of the second embodiment which correspond to those of the first embodiment in FIG. 1 will be represented by the same reference numerals for description.

A fundamental difference between the second embodiment and the first embodiment lies in shapes of the elastic shim members 10. Speaking concretely, an elastic shim member 10 is folded in a U shape, and two portions which are opposed to each other are used as an arm section 10a and a driving section 10b. A shielding plate 12 is attached to a tip of the arm section 10a perpendicularly to the arm section 10a for shielding a pyroelectric sensor unit 15 from an incident infrared ray 16, piezoelectric ceramic members 11a and 11b are bonded to front and rear surfaces of the elastic shim member 10 in the driving section 10b, and an end of the driving section 10b is attached to a stand 13 with a fixing member 14 as in the configuration shown in FIG. 1.

Since the elastic shim member 10 is folded in the U shape, the stand 13, the fixing member 14 and the driving section 10b are arranged and attached in manners modified from those shown in FIG. 1.

The second embodiment provides effects similar to those obtained by the first embodiment and is capable of separating oscillations of the arm section 10a almost completely from that of the driving section 10b, thereby permitting designing these members separately without considering mutual influences, or enhancing design precisions. Further, the U-shaped elastic shim member 10 serves for configuring the pyroelectric IR sensor compactor.

Furthermore, effects similar to those obtained with the configuration shown in FIG. 2 can be obtained by using the two facing portions of the U shape of the elastic shim member 10 as "an arm section 10a" and "a driving section 10b+a leg section 10c" as in the first embodiment.

It is needless to say that the second embodiment, like the first embodiment, makes it possible:

to obtain the similar effects even when the driving section 10b is designed not as the bimorph type element but as the unimorph type;

to lower an applied voltage to ½ without changing an aperture diameter or enlarge the aperture diameter twice as large without changing the applied voltage;

to obtain the similar effect by using a high polymer or a single crystal having piezoelectric characteristic in place of the piezoelectric ceramic.

to obtain the similar effect by using an elastic shim member 10 composed of an electrically conductive resin sheet in place of the elastic shim member made of the thin metal heet;

to obtain the similar effect by using 1 disk-like or ring-like piezoelectric ceramic members 11a and 11b;

to obtain effects similar to those obtained with the configuration shown in FIG. 3 by disposing the pyroelectric sensor unit 15 so that the longitudinal direction of the arm section 10a is perpendicular to the direction of incidence onto the pyroelectric sensor unit 15 and setting a resonance frequency of torsional oscillation of the bonded element at a level two or more times as high as a driving frequency; and to obtain effects obtained with the configurations shown in FIGS. 4 through 8 by optionally setting relationship between a driving frequency and the resonance frequencies.

(Third Embodiment)

Figure 10:
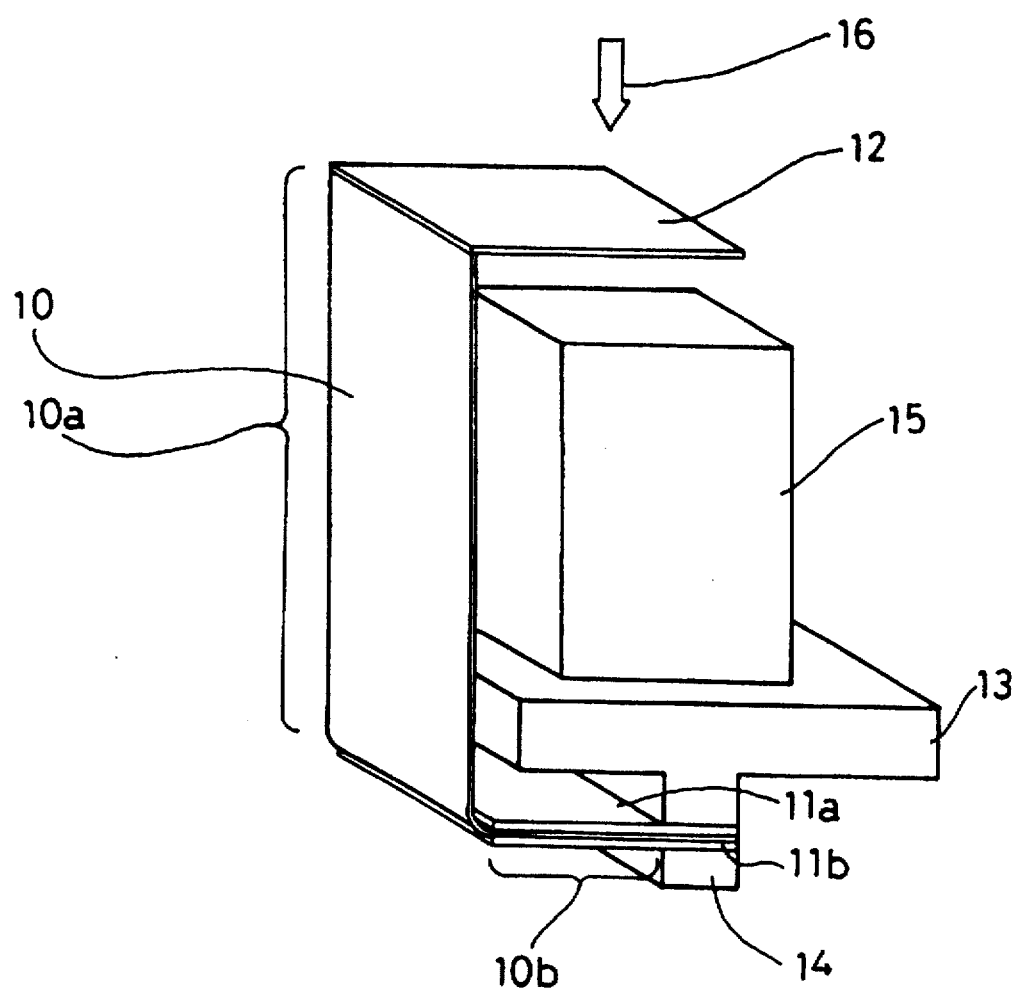
FIG. 10 is a perspective view illustrating a configuration of a third embodiment of the pyroelectric IR sensor using the bimorph type piezoelectric actuator according to the present invention.

FIG. 10 shows a third embodiment of the pyroelectric IR sensor according to the present invention. Members of the third embodiment which correspond to those illustrated in FIG. 1 will be represented by the same reference numerals for description.

A fundamental difference between the third embodiment and the first embodiment lies in shapes of elastic shim members 10. Speaking concretely, an elastic shim member 10 is folded in an L shape, and two sections composing the L shape are used as an arm section 10a and a driving section 10b in the third embodiment. A shielding plate 12 is attached to a tip of the arm section 10a perpendicularly to the arm section 10a for shielding a pyroelectric sensor unit 15 from an infrared ray 16, and piezoelectric ceramic members 11a and 11b are bonded to front and rear surfaces of the elastic shim member 10 in the driving section 10b, and an end of the driving section 10b is attached to a stand 13 with a fixing member 14 as in the configuration shown in FIG. 1. Since the elastic shim member 10 is folded in the L shape, a form of the stand 13 and attachment of the driving section 10b are modified from those shown in FIG. 1.

The third embodiment provides effects which are similar to those obtained with the first embodiment. In the first embodiment or the second embodiment wherein the arm section 10a and the driving section 10b are oscillated in the same direction, the oscillation of the driving section 10b influences on the oscillation of the arm section 10a though slightly. Speaking concretely, oscillation of the arm section 10a can be designed rather hardly since it is difficult to uniquely determine a supported condition of the arm section 10a at the design stage. Accordingly, the third embodiment adopts the L-shaped elastic shim member 10 so that oscillation of the arm section 10a and that of the driving section 10b are deviated 90 degrees and separated from each other, thereby permitting obtaining design precisions higher than those in the first or second embodiment.

Further, the third embodiment provides the effects similar to those obtained with the configuration shown in FIG. 2 when the two sections which compose the L shape of the elastic shim member 10 are used as "an arm section 10a" and "a driving section 10b+a leg section 10c".

It is needless to say that the third embodiment, like the first embodiment, makes it possible:

to obtain similar effect even when the driving section 10b is composed not as a bimorph type element but as a unimorph type element;

to halve an applied voltage without changing an aperture diameter or enlarge the aperture diameter without changing the applied voltage by using two piezoelectric choppers;

to obtain similar effect by using a high polymer material or a single crystal material having a piezoelectric characteristic in place of the piezoelectric ceramic material;

to obtain similar effects by using an elastic shim member 10 composed of an electrically conductive resin sheet in place of the elastic shim member 10 composed of the thin metal sheet;

to obtain similar effects by using disk-like of ring-like piezoelectric ceramic members 11a and 11b though driving efficiency is lowered;

to obtain effects similar to those obtained with the configuration shown in FIG. 3 when the pyroelectric sensor unit 15 is disposed so that the longitudinal direction of the arm section 10a is perpendicular to the direction of incidence onto the pyroelectric sensor unit 15 and a resonance frequency of torsional oscillation of the bonded element is set at a level two or more times as high as a driving frequency; and to obtain effects similar to those obtained with the configurations shown in FIGS. 4 through 8 by setting optional relationship between a driving frequency and resonance frequencies.

(Fourth Embodiment)

Figure 11:
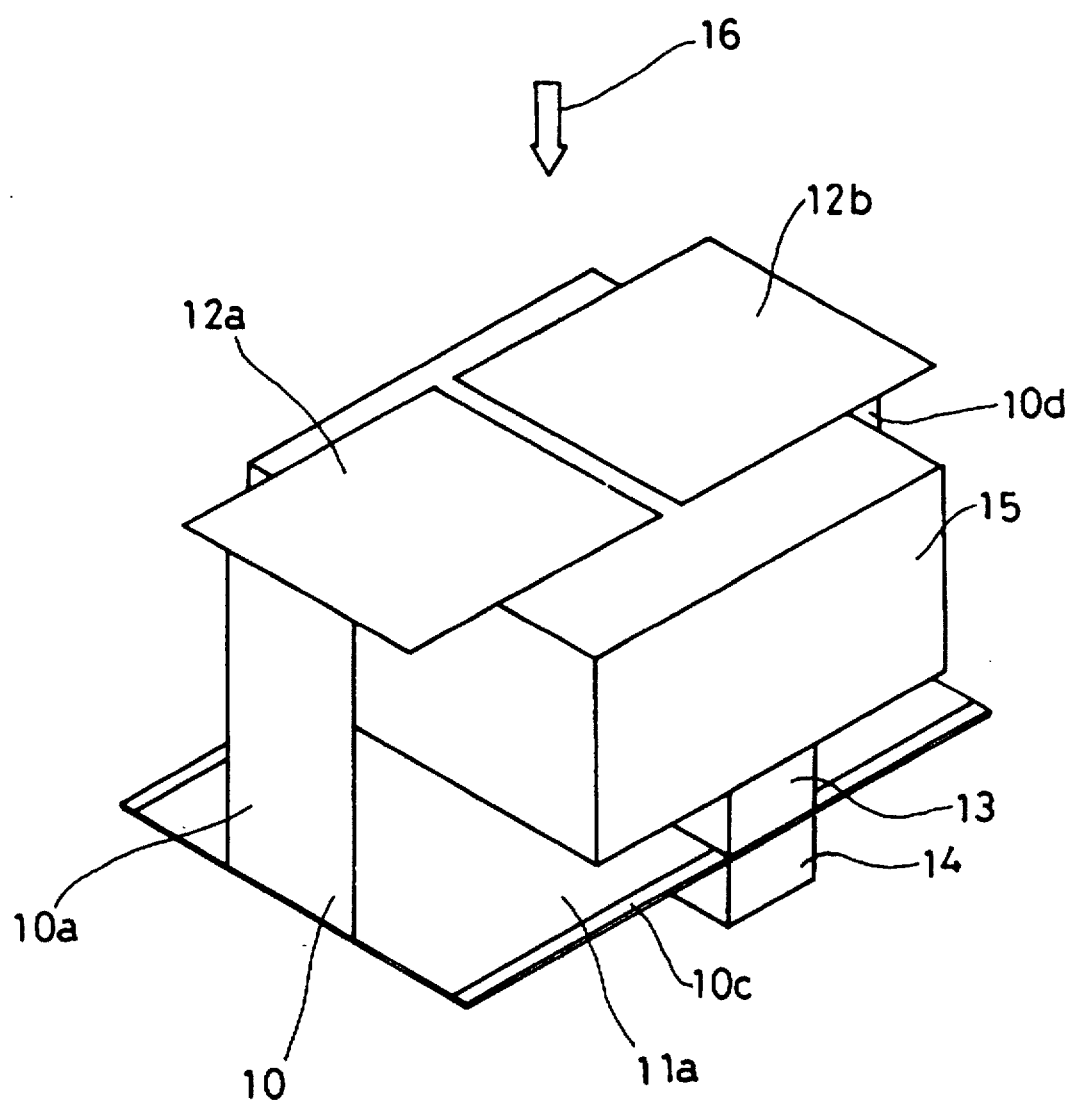
FIG. 11 is a perspective view illustrating a first example of a fourth embodiment of the pyroelectric IR sensor using the bimorph type piezoelectric IR sensor according to the present invention.
Figure 12:
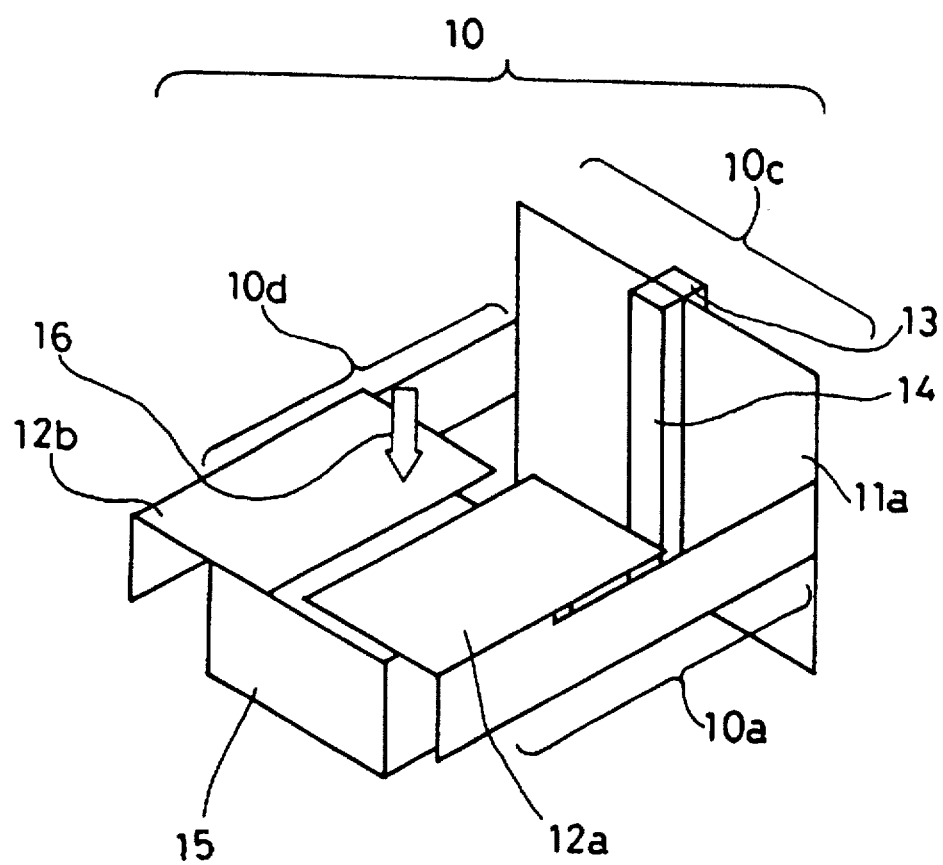
FIG. 12 is a perspective view illustrating a configuration of a second example of the fourth embodiment of the pyroelectric IR sensor using the bimorph type piezoelectric sensor.

FIG. 11 shows a fourth embodiment of the pyroelectric IR sensor according to the present invention. Members of the fourth embodiment which correspond to those shown in FIGS. 1 and 10 are represented by the same reference numerals for simplicity of description.

The two piezoelectric choppers formed in the third embodiment is composed of a single element in the fourth embodiment.

Speaking concretely, an elastic shim member 10 is folded in a U shape, and two end sections of the U shape are used as arm sections 10a and 10d, whereas a section connecting the arm sections 10a and 10b to each other is used as a driving section 10b (a connecting surface). Shielding plates 12a and 12b are attached integrally or separately to tips of the arm sections 10a and 10d respectively at right angles to the arm sections 10a and 10d for shielding a pyroelectric sensor unit 15 from an incident infrared ray, piezoelectric ceramic members 11a and 11b are bonded to front and rear surfaces of the elastic shim member 10 in the driving section 10b, and a middle portion of the driving section 10b is attached to a stand 13 with a fixing member 14. Since the elastic shim member 10 is folded in the U shape, a form of the stand 13 and attachment of the driving section 10b are modified from those illustrated in FIGS. 1, 9 and 10.

The fourth embodiment provides effects similar to those obtained with the third embodiment.

In contrast to the third embodiment which requires a driving section for each of the two piezoelectric choppers, the fourth embodiment makes it possible to use a single driving section for two choppers and facilitates to match characteristics between the two choppers.

Further, the fourth embodiment can provide effects similar to those obtained with the configuration shown in FIG. 2 when the connecting surface of the elastic shim member 10 is used as "a driving section 10b+a leg section 10c+a driving section 10e" as in the first embodiment.

It is needless to say that the fourth embodiment makes, like the first embodiment, it possible:

- to obtain similar effects even when the driving section 10b is designed not as a bimorph type element but as a unimorph type element;
- to obtain similar effects by using a high polymer material or a single crystal material having a piezoelectric characteristic in place of the piezoelectric ceramic material;
- to obtain similar effects by using an elastic shim member 10 composed of an electrically conductive resin sheet in place of the elastic shim member 10 composed of the thin metal sheet;
- to obtain similar effects by using disk-like or ring-like piezoelectric ceramic members 11a and 11b though driving efficiency is lowered;
- to obtain effects similar to those obtained with the configuration shown in FIG. 3 when the pyroelectric sensor unit 15 is disposed so that the longitudinal direction of the arm section 10a is perpendicular to the direction of incidence onto the pyroelectric sensor unit 15 and a resonance frequency of torsional oscillation of the element is set at a level two or more times higher than a driving frequency (FIG. 12); and
- to obtain effects similar to those obtained with the configurations shown in FIGS. 4 through 8 by optionally setting relationship between a driving frequency and resonance frequencies.

(Fifth Embodiment)

Figure 13:
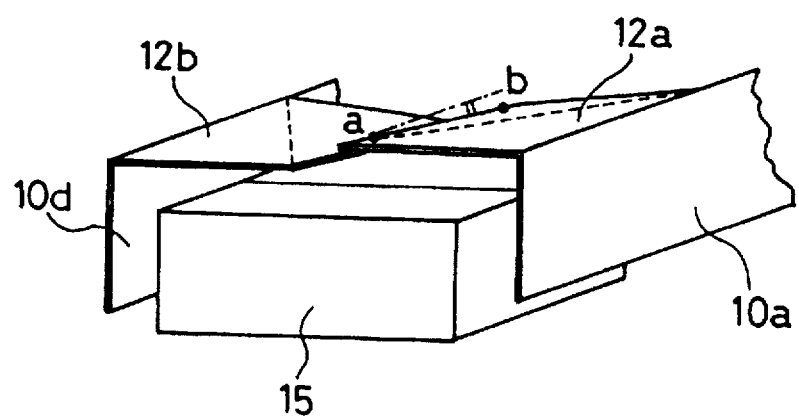
FIG. 13 is a perspective view illustrating shielding plates for a chopper of a fifth embodiment of the pyroelectric IR sensor using the bimorph type piezoelectric actuator according to the present invention.

FIG. 13 shows shielding plates of a chopper for the fifth embodiment of the pyroelectric IR sensor which uses a bimorph type piezoelectric actuator.

In FIG. 13, a reference numeral 10 represents an elastic shim member, reference numerals 10a and 10d designate arm sections, reference numerals 12a and 12b denote shielding plates, a reference numeral 15 represents a pyroelectric sensor unit and a reference numeral 16 designates an infrared ray.

The pyroelectric sensor unit 15 is disposed in the vicinity of free ends of the arm sections 10a and 10d of the elastic shim member, and the infrared ray 16 is allowed to be incident or intercepted by the shielding plates 12a and 12b.

The shielding plates 12a and 12b which govern the incidence and interception of the infrared ray 16 are attached in the vicinities of the free ends of the arm sections 10a and 10d of the elastic shim member so as to have normal vectors in directions along the surface of the mating arm section and perpendicular to the longitudinal direction of the arm section, and angled along diagonal lines of the shielding plates, for example, so that they are farther from the pyroelectric sensor unit 15 in directions from the fixed ends toward the tips thereof.

Figure 14:
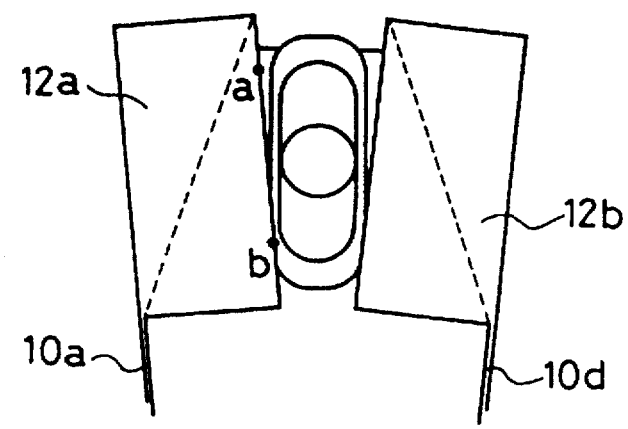
FIG. 14 is a plan view illustrating shielding plates for the chopper of the fifth embodiment of the pyroelectric IR sensor using the bimorph type piezoelectric actuator.

When the arm sections 10a and 10b are oscillated, the shielding plates attached to the tips are moved, thereby intermittently intercepting the infrared ray 16 from being incident onto the pyroelectric sensor unit 15. FIG. 14 is a top view of an example of the piezoelectric chopper for the fifth embodiment.

In FIG. 14, reference numerals 10a and 10d represent the arm sections, reference numerals 12a and 12b designate the shielding plates, and a reference numeral 15 denotes the pyroelectric sensor unit. Further, a reference symbol a represents a point of the shielding plate for intermittently intercepting an infrared ray which is incident onto the pyroelectric sensor unit 15 on a side closest to the free end and a reference symbol b designates a point of the shielding plate for intermittently intercepting an infrared ray which is incident onto the pyroelecytric sensor unit 15 on a side closest to the fixed end.

In the chopper which is configured as described above, the point b has a opening/closing speed which is slower than that of the point a and forms an aperture narrower than that formed by the point a. For equalizing the opening/closing speeds and apertures, the shielding plate is disposed to locate the point b closer to the pyroelectric sensor unit 15 than the point a.

Accordingly, the pyroelectric sensor unit 15 has a visual field for the point b which is narrower than that for the point a. By designing the shielding plates so as to optimize the difference between the visual fields of the pyroelectric sensor unit 15, it is possible to set all portions of the shielding plates so as to move uniformly as seen from the pyroelectric sensor unit 15.

A guideline for optimum design of the shielding plates will be described below:

An optimum value of a difference between distances from the pyroelectric sensor unit 15 to the points a and b ($h_a$-$h_b$) is expressed as:

$$(h_a - h_b) = h_a \cdot \left\{ \frac{(L_a^2 - L_b^2)}{L_a^2} \right\} - \frac{r}{\tan\theta \cdot \left\{ \frac{1 - L_b^2}{L_a^2} \right\}}$$

wherein reference symbols are:

$L_a$ ... a distance from a fixed end of the arm section to the point a $L_b$ ... A distance from the fixed end of the arm section to the point b r ... A lens diameter of the pyroelectric sensor unit 15

$2\Theta$ ... An angle of view of the pyrolectric sensor unit 15

$h_b$ ... A distance from the point b to the pyroelectric sensor unit 15

When the shielding plates are designed as described above, motions of all the portions of the shielding plates are uniform as seen from the pyroelectric sensor unit 15, whereby the fifth embodiment makes it possible to obtain a pyroelectric IR sensor which has high accuracy and high performance, and permits a constant opening/closing time and a constant aperture for all portions of the pyroelectric sensor unit 15.

What is claimed is:

1. A pyroelectric IR sensor comprising:

a pyroelectric sensor unit for detecting infrared rays emitted from an object; shielding plates for intercepting incident infrared rays from the pyroelectric sensor unit;

a thin elastic sheet composed of a planar sheet folded into a U shape so as to have three surfaces, out of which a connecting surface connecting the other two surfaces is fixed at its middle portion or in the vicinity thereof and said shielding plates are attached, in a shape of hooks, to ends of the other two surfaces; and piezoelectric members or a piezoelectric member formed on both surfaces or a surface of said connecting surface except a partial region thereof, elongated and contracted with an applied voltage, wherein said shielding plates are oscillated by warping motions of said thin elastic sheet for shielding said pyroelectric sensor unit from infrared rays incident from said object and releasing the interception of said infrared rays.

2. A pyroelectric IR sensor according to claim 1, wherein a fixing member for fixing said thin elastic sheet functions to fix only said thin elastic sheet.

3. A pyroelectric IR sensor according to claim 1, wherein a piece to which said shielding plate is attached is disposed in parallel with a direction of incidence of said infrared rays.

4. A pyroelectric IR sensor according to claim 1, wherein a piece to which said shielding plate is attached is disposed perpendicularly to a direction of incidence of said infrared rays.

5. A pyroelectric IR sensor according to claim 1, wherein a resonance frequency frr of torsional oscillation of a piece to which said shielding plate is attached is set at a level two or more times as high as a driving frequency frb.

6. A pyroelectric IR sensor according to claim 1, wherein a distance between said shielding plate and said pyroelectric sensor unit is continuously varied from a side of a fixed and toward a free end of a piece to which said shielding plate is attached.

7. A pyroelectric IR sensor according to claim 1, wherein a driving frequency for said piezoelectric members or member is set a resonance frequency of a piece having said piezoelectric members and a resonance frequency of a piece to which said shielding plate is attached.

8. A pyroelectric IR sensor according to claim 1, wherein a resonance frequency of a piece having said piezoelectric members or member and a piece to which said shielding plate is attached are close to each other, and a driving frequency for said piezoelectric members or member is set in the vicinity of said resonance frequencies.

9. A pyroelectric IR sensor according to claim 1, wherein a resonance frequency $f_{r2}$ of a piece having said piezoelectric members or member is set at least twice as high as a resonance frequency $f_{r1}$ of a piece to which said shielding plate is attached and a driving frequency for said piezoelectric members or member is set in the vicinity of the resonance frequency of the piece to which said shielding plate is attached.

10. A pyroelectric IR sensor according to claim 1, wherein a resonance frequency of a piece having said piezoelectric members or member is set at a level not exceeding ½ of a resonance frequency of a resonance frequency of a piece to which said shielding plate is attached and said piezoelectric members or member is driven at a frequency in the vicinity of the resonance frequency of the piece having said piezoelectric members or member.

* * * * *